United States Patent
Legare

(10) Patent No.: US 6,211,100 B1
(45) Date of Patent: *Apr. 3, 2001

(54) SYNTHETIC FILTER MEDIA

(75) Inventor: Pierre Legare, Athens (CA)

(73) Assignee: Minnesota Mining and Manufacturing Company, Saint Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 5 days.

(21) Appl. No.: 08/641,379

(22) Filed: Apr. 30, 1996

(51) Int. Cl.⁷ .......................... B01D 39/08; D04H 13/00; B32B 5/06
(52) U.S. Cl. .......................... 442/36; 442/383; 442/387; 442/388; 442/400; 442/401; 442/402; 442/407
(58) Field of Search ............................. 442/36, 383, 387, 442/388, 400, 401, 402, 407

(56) References Cited

U.S. PATENT DOCUMENTS

| Re. 30,782 | 10/1981 | van Turnhout . |
| 3,192,598 | 7/1965 | Stevenson et al. . |
| 4,375,718 | 3/1983 | Wadsworth et al. .................. 29/592 |
| 4,798,850 | 1/1989 | Brown . |
| 5,038,775 | 8/1991 | Maruscak et al. ............. 128/205.27 |
| 5,230,800 | 7/1993 | Nelson . |
| 5,368,734 | 11/1994 | Wnenchak .......................... 210/506 |
| 5,419,953 | 5/1995 | Chapman ........................... 428/284 |

FOREIGN PATENT DOCUMENTS

| 1278659 | 1/1991 | (CA) . |

*Primary Examiner*—Kathleen Choi
(74) *Attorney, Agent, or Firm*—Ridout & Maybee

(57) ABSTRACT

A composite filter media (100) includes a meltblown/spunbond composite fiber material and a mixed fiber triboelectric material are preferably attached to each other by needling the mixed fiber material with the meltblown/spunbond composite fiber material. A netting (104) is then attached by preferably needling the mixed fiber triboelectric material and meltblown through the netting (104).

19 Claims, 1 Drawing Sheet

SYNTHETIC FILTER MEDIA

FIELD OF THE INVENTION

This invention relates in general to filtration media and more particularly to a composite filtration media and method of manufacturing such media.

BACKGROUND OF THE INVENTION

Early filtration media were largely derived from naturally occurring fibers such as wool, cellulose, asbestos, or other fibers commonly found in nature. Today wool and cellulose still play an important role, although asbestos has long since been discarded for reasons of its toxicity.

With the advent of plastic polymers, new media based on synthetic fibers are possible, featuring enhanced properties for filtration. At the same time, new filtration problems have arisen, such as automotive interior cabin filtration, and room cleaners applied to improving air quality in homes. These applications are particularly difficult as a filtration problem, as they target very fine particulate into submicron size, while at the same time demanding very low pressure drop performance in consideration of limited fan capabilities, all within highly limited space constraints. The preferred filter construction in respect of small size expectation is a pleated filter, in order to achieve increased filtration area per unit volume.

The limited size of available area results in high air velocity within the filtration media, posing a difficult problem for the media designer. Typically, this has meant certain performance trade-offs. One of the most fundamental of filtration trade-offs is between particle capture efficiency on the one hand, and pressure drop on the other.

Typically, the less obtrusive the filtration media is to air flow, the higher the flow output from the system into which the filter is installed. Filtration efficiency must often be compromised to keep flow within acceptable limits, to obtain satisfactory air system performance.

In certain filtration media commonly applied to the aforementioned applications, low pressure drop is gained through use of relatively coarse fibers, typically 10 micron average diameter and greater. Both round and rectangular fibers have been applied, the later commonly referred to as split fiber electret. These fibers are in turn electostatically charged to enhance the level of particle capture efficiency for small particles, through the action of the electrostatic charge forces acting to attract these finer particles to the fibers. In practice these media have been found to lose their effectiveness as a function of time. In certain instances this occurs rapidly in the space of just days or weeks, particularly on exposure to elevated humidity and temperature, or on exposure to certain classes of aerosols, such as oily aerosols. The use of very thin media of low basis weight, comprising fine fibers in the range of 1 to 5 microns can significantly lower this tendency while still respecting the pressure drop demand, but at the expense of low loading capacity and thus much shortened filter life relative to the coarse fiber approach.

As increasing awareness of the hazards associated with certain airborne particulate increases the demand for filtration solutions, coupled with an increased concern over disposal frequency of used filters, designers are pushed to develop media possessing stable operating characteristics, combined with high loading capacity, while at the same time respecting the pressure drop limitations of these high volumetric flow applications. A need thus exists in the art for a filter media and method for manufacturing same, which can address the problems mentioned above.

SUMMARY OF THE INVENTION

Briefly, according to the invention, a composite filtration media which provides for improved capacity with stable filtration characteristics, comprises a mixed fiber triboelectric material, a meltblown/spunbond composite material having a first side comprising meltblown fibers, and a second side comprising spunbonded fibers, and a netting material having openings. The meltblown/spunbond composite material is combined with the mixed fiber triboelectric material through fiber entanglement, in a manner such that portions of the meltblown and spunbonded fibers are interspersed into the bulk of the mixed fiber triboelectric material, and further such that the entangled combination of mixed fiber and meltblown and spunbonded fibers are located both above and below the planar surfaces of the netting material, and also pass through the openings in the netting material.

In another aspect of the invention, a method of manufacturing the above noted media includes the steps of laying a mixed fiber triboelectric material onto the meltblown side of a meltblown/spunbond composite material, then entangling the mixed fiber triboelectric material with the meltblown/spunbond composite material. Finally, laying the above material onto a netting such that the mixed fiber triboelectric material side of the material contacts the netting; and entangling the material with the netting.

DETAILED DESCRIPTION OF THE PREFERRED EMBODIMENT

Figure 1:
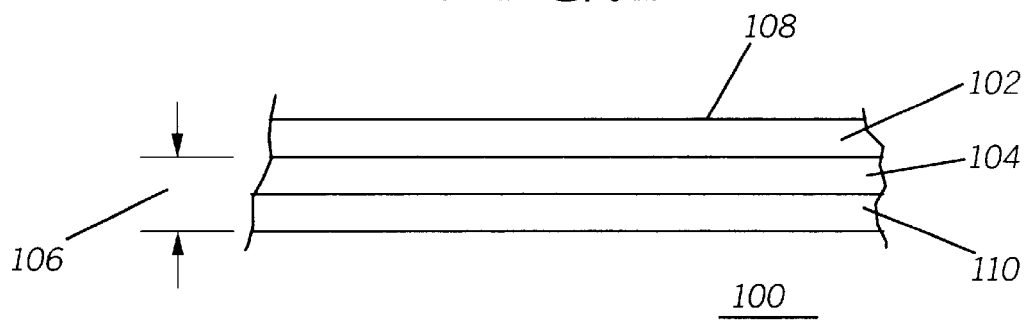
FIG. 1 shows a cross-sectional view of a composite filter media in accordance with the present invention.

Base materials employed:

Referring now to the drawings and in particular to FIG. 1, there is shown a cross-sectional view of a composite filter media 100 in accordance with the invention. The base materials employed in the manufacture of the composite filtration media 100 includes a first media preferably a mixed fiber material formed from an approximately 50%/50% mixture of modacrylic and polypropylene fibers preferably having 15 to 20 microns average fiber diameter.

The first media preferably has a mixture weight of 35 to 100 gram/meter$^2$. Prior to mixing, the fibers are scoured to remove all surface contamination, to enable formation of a stable triboelectric charge. The mixture provides for high, stable positive charge and a high, stable negative charge on a microscopic level, along with overall electrical neutrality. Although a mixture approximating 50%/50% of polypropylene and modacrylic fibers is desirable to promote uniform charge distribution throughout the bulk of the mixture, a mixture having differences in the ratio of materials employed can be substituted. For example, mixture ratios of polypropylene fibers to modacrylic fibers from 30:70 to 80:20, more preferably 40:60 to 70:30 may be used to form the mixed fiber triboelectric material.

The mixture of the two materials above becomes electrically charged during the nonwoven manufacturing process. Filtration efficiency is particularly enhanced by electrical charges on the fiber for capturing sub-micron sized particles.

A mixed-fiber material which can be used as the first media is explained in detail in U.S. Pat. No. 4,798,850, entitled "Blended-fibre filter material" by Richard Collin Brown, the disclosure of which is hereby incorporated by reference. The product described in that patent is sold commercially under the trademark TECHNOSTAT® manufactured by the Hepworth Company, or product sold commercially as Flo-Clean™, manufactured by the American Felt and Filter Company.

It is worth noting that although in the preferred embodiment, a mixture of modacrylic and polypropylene is utilized, other fibers can be utilized as well. For example, a blend of clean polyolefine fibers and clean fibers of an addition polymer, preferably comprising one or more halogen-substituted hydrocarbons can be utilized. The halogen is preferably fluorine or chlorine, and the hydrocarbon may be a polyolefine, preferably polyethylene or polypropylene. The modacrylic fibers could thus be replaced for example with, polyvinyl chloride, polyvinylidene chloride, vinyl chloride vinylidene chloride copolymer, chlorinated polyvinyl chloride, or polytetrafluorethylene. While the polypropylene fibers could be replaced with other polyolefine fibers such as polyethylene or ethylenepropylene copolymer. In the preferred embodiment, the modacrylic fibers can be a copolymer comprising from 35 to 85 weight percent acrylonitrile units, with the balance substantially made up of other addition-polymer-forming units, being halogenated hydrocarbon such as vinyl chloride or vinylidene chloride.

Given the high filtration efficiency of the above mixture of modacrylic and polypropylene fibers for trapping dust particles using electrostatic attraction, it is one of several preferred substrates useful in carrying out this invention. Another such material is formed using a combination of polytetrafluroroethylene and nylon fibers manufactured by W. L. Gore Filtration, Elkton, Md., and sold under the brandname GORETRET™.

A second base material or media used in the manufacture of the composite filter media 100 is a polypropylene meltblown having a weight of between 5 to 10 gram/meter$^2$ and average fiber size in the range of 1 to 5 microns. A third base material or media preferably comprises a polyester or polypropylene spunbond material preferably in sheet form having a weight of approximately 10 to 16 gram/meter$^2$.

A fourth base material, or media, comprises extruded polypropylene netting. The netting material is preferably substantially planar having first and second major surfaces. It is worth noting that other materials such as polyethylene or nylon can be used for the netting material. Various net configurations can be employed. Good results have been observed with a 0.033 inch thick netting, having filaments arrayed in a diamond shaped pattern having a filament intersection angle of 85 to 88 degrees, and 19 to 20 strands per inch filament count in either direction.

Manufacturing process:

In the preferred embodiment, the composite filter media 100 is manufactured by melt blowing the polypropylene fibers onto a polyester spunbond sheet, although a polypropylene spunbond can be employed as a substitute. This is followed by applying an electrostatic charge with appropriate charging equipment as known in the art. An example of commercially available polypropylene meltblown on spunbonded sheet which can be used to practice the invention is produced by the Hollingsworth and Vose Company of West Groton, Mass., having a product code CM-004-001. The spunbond/meltblown is then formed up into rolls, for transfer to the next step of the process.

Polypropylene and modacrylic staple fibers are mixed in the ratio noted previously above, and are then deposited, employing suitable equipment for air laying of fibers, or by using anyone of other well known techniques, onto the meltblown/spunbond layer. Following deposition of the staple fibers in the desired weight, the mixed fibers are then attached to the substrate meltblown/spunbond layer, by passage preferably through a needle loom in a first needling operation. The needles act to entangle the two media together. In this first needling operation, the needles are punched in a direction in which they first make contact with the mixed fibers. In a conventional needle punch where the needles punch downward, the media would be introduced into the loom with the mixed fiber material on top and the meltblown/spunbond composite on the bottom.

The composite filter media 100 is finished by turning the entangled media over so that the mixed fiber layer is positioned on the bottom and the meltblown/spunbond composite is on top, with the spunbond layer as the uppermost layer. Next, the media is laid, mixed fiber side down, onto an extruded plastic netting. The netting and media are then fed through a second needle loom operation, which causes the media to become attached to the netting by punching needles through the meltblown/spunbond composite such that the mixed fibers and meltblown materials are pushed through the openings in the netting material. Due to the physical nature of this needling process, some of the meltblown material is entangled with the mixed fiber material. As the needles punch downward through the spunbond sheet they grab some of the meltblown on the other side driving it into the mixed fiber and forcing the entangled mixed fiber and meltblown material through the openings in the netting sheet.

It is worth noting here that after this operation is performed, a sufficient amount of the meltblown and mixed fiber material is passed through the openings in the netting that the netting almost entirely disappears from view. The netting after this step appears to be located in the middle of the media, with the spunbond sheet on one side, and the mixed fiber and a portion of the meltblown on the other side of the netting.

Equally important is that this step not only joins the materials but also further increases the permeability of the finished media. After the first needling operation, a Frazier permeability rating in the order of 170–220 CFM is observed when combining 70 gram/meter$^2$ of mixed fiber material with a 5 gram/meter of meltblown. However, after the second needling operation, the Frazier permeability rating is observed to improve to 330–350 CFM. At the same time, the netting has imparted to the composite media the ability to be pleated as well as added tensile strength to the media.

Also important, is the tendency of the needles in the second needling operation to drive some of the meltblown into the mixed fiber, so that charge interaction between the charge on the meltblown and the opposite charge in the triboelectric is observed. Since the needles can only pull fibers down in one direction (direction of stroke), the meltblown will only become dispersed through the mixed fiber if it is on top of the mixed fibers as the needles are punched downward.

It is worth noting here that although the material was flipped in the preferred embodiment due to the manufacturing facilities available at the time of the writing of this application, those skilled in the art should realize that the invention could be accomplished using more sophisticated manufacturing facilities. For example, using multi-punch facilities or facilities that have needle looms which punch with an upward stroke, etc. As such, some of the steps discussed above could potentially be modified to accommodate different manufacturing environments.

The needle punch density applied during both the first and second needling operation should be preferably at least 250 punches/inch$^2$. Once manufactured using the manufacturing process explained below, the finished composite filter media 100 will appear in cross-section as shown in FIG. 1. Section 102 is the spunbond/meltblown layer including some mixed fiber (see step 204 below). The top most surface being the spunbond sheet. Section 104 is the netting while section 106 comprises the mixed fiber (modacrylic and polypropylene fibers) and polypropylene meltblown.

It is important to note that after the second needling operation (see step 210 below), some of the polypropylene meltblown found in section 102 (as well as some of the spunbond fibers) are forced through the openings in the netting material 104 with the mixed fibers and are entangled with the mixed fiber material throughout section 106. Section 110 which covers the netting material 104 on the bottom side surface, includes mixed fiber material and meltblown material, as well as portions of spunbond material which have been driven downward by the needling process. Therefore, once completed, the netting material 104 is caused to be located between the spunbond sheet material 108 and the entangled mixed fiber and meltblown fibers 110.

Figure 2:
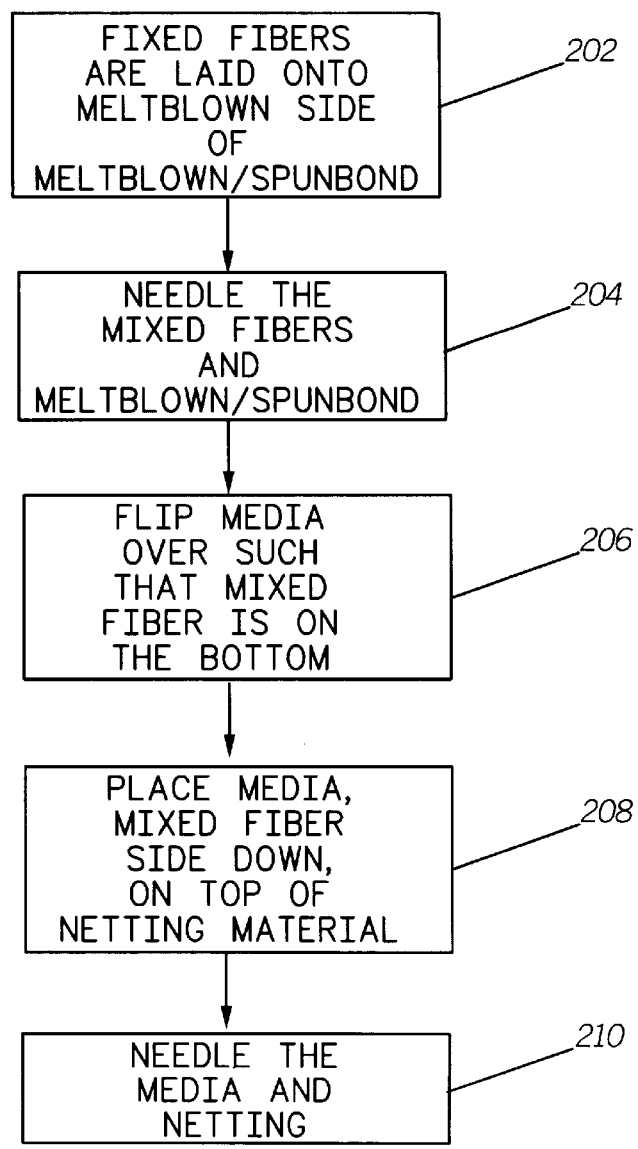
FIG. 2 shows a flowchart which illustrates the manufacturing steps used to manufacture the composite filter media in accordance with the preferred embodiment.

Referring now to FIG. 2, the manufacturing steps are summarized in a flowchart. In step 202, the preferably 50%/50% mixture of polypropylene and modacrylic mixed fibers are air laid onto the meltblown side of the meltblown/spunbond composite. Next, in step 204, the meltblown/spunbond with the mixed fiber topping are run through a needle loom in order to join the materials together. The needling process is preferably set up to a needle punch having a density of at least 250 punches/inch$^2$. Once step 204 is completed, the media is flipped over in step 206, such that the mixed fiber is now on the bottom. Next, in step 208, the media, mixed fiber side down is laid on top of the extruded plastic netting. In step 210, the media from step 204 and netting are passed through a second needling operation, netting on the bottom. Again, the second needling operation using a punch density of at least 250 punches/inch$^2$.

In the finished product, the netting largely disappears from view, due to the needling operation in step 210, forcing fibers through the openings in the netting. The fibers protrude through the other side of the netting, giving the appearance that the netting is sandwiched in the middle.

Exemplary Performance Results

A composite filter media in accordance with the invention which was formed from a composite sheet comprising 70 grams of mixed fiber triboelectric material, 5 grams/meter$^2$ meltblown, 12 gram/meter$^2$ spunbond and 0.033 thick inch plastic netting yielded the following results: Frazier air permeability (CFM/feet$^2$ for 0.5 inch H$_2$O pressure drop): 170–200 CFM, after the first needling operation, after the second needling operation described above, the air permeability rating improves to 330–350 CFM. Efficiency against sodium chloride aerosol at 85 liters-per-minute (lpm) as measured on a TSI automatic filter testing machine type 8110, TSI Inc., Minneapolis, Minn.: 95–97%. If 35 grams of mixed fibers are used instead of 70 grams as noted above, the results yield a Frazier air permeability of 400 CFM and an efficiency of 80%.

The performance characteristics noted are typical for the constructions noted above. Individual filter media characteristics can be adjusted to suit individual application parameters by variation of basis weights of material within the ranges noted.

Functions of the various filter media materials used:

The mixed fiber material, which is triboelectrically charged, imparts depth filtration characteristics and helps promote high dust capacity to the finished product. The fine meltblown microfiber material in turn contributes to improved mechanical filtration characteristics, thereby imparting resistance to aging induced performance losses. While the spunbond material acts as a support layer for the meltblown fibers. Finally, the netting renders the product pleatable, at minimal expense of reduction in permeability.

Due to the graded density structure of the composite filter media 100, e.g., coarser mixed fibers on inlet side of filter media, leading into finer fibers intermixed between coarser fibers on the outlet or downstream side of filter, provides for some advantages. The resulting media possesses a higher dust loading capacity relative to straight meltblown, spun bonds, cellulose or other similar materials commonly applied to filtration applications, where filtration is predominantly a surface loading phenomenon. The present invention allows for depth filtration in the mixed fiber needlefelt layer, considerably enhancing capacity. Secondly, the resulting media is more resistant to fine particles, e.g., below 1 micron, efficiency losses as a function of increasing particle loading, relative to straight triboelectric, split fiber, or other similar electrostatic enhanced high loft media products. Thirdly, the resulting media possesses a higher filtration index, a measure of the level of efficiency achieved against the resistance to airflow, in comparison to exactly the same materials combined by simple layering. Fourthly, as the layers are physically combined, they will not separate due to differential expansion and contraction rates brought upon by temperature fluctuations, as would occur if the materials were simply copleated together as separate layers. By incorporating plastic netting to the overall structure, the product may be pleated for applications involving space constraints, such as cabin air filtration in vehicles.

The consequence of combining the materials in the fashion noted above, leads to a multi-component, 100% synthetic, nonwoven filtration media showing surprising improvement in permeability rating for the efficiency level achieved. The particle capture stability also improves, to varying extent depending on the particle size under consideration.

While the invention has been described in conjunction with specific embodiments, it is evident that many alternatives, modifications, permutations and variations will become apparent to those skilled in the art in light of the foregoing description.

What is claimed is:

1. A filter media, comprising:
    a mixed fiber triboelectric material;
    a meltblown/spunbond composite material having a first side having meltblown material and a second side having a spunbond material, and the meltblown/spunbond composite material is attached to the mixed fiber triboelectric material by entangling the meltblown material with the mixed fiber triboelectric material; and
    a netting material having openings, and the netting material is attached by passing some of the mixed fiber triboelectric material and meltblown material through the openings in the netting material.

2. A filter media as defined in claim 1, wherein the mixed fiber triboelectric material comprises a combination of clean polyolefine fibers with clean fibers of a substituted addition polymer.

3. A filter media as defined in claim 1, wherein the mixed fiber triboelectric material comprises a mixture of modacrylic and polypropylene fibers.

4. A filter media as defined in claim 3, wherein the mixed fiber triboelectric material has a weight in the range of 35 to 100 grams/meter$^2$ and average fiber size diameter in the range of 15–20 microns.

5. A filter media as defined in claim 3, wherein the meltblown/spunbond composite material comprises polypropylene fibers which are melt blown onto a polyester or polypropylene spunbond sheet.

6. A filter media as defined in claim 5, wherein the melt blown polypropylene fibers have a weight in the range of 5 to 10 grams/meter$^2$ and the average fiber diameter is in the range of 1–5 microns.

7. A filter media as defined in claim 5, wherein the spunbond sheet comprises polyester or polypropylene spunbond having a weight in the range of 10–16 grams/meter$^2$.

8. A filter media as defined in claim 5, wherein the polypropylene meltblown fibers have imparted to them an electrostatic charge.

9. A filter media as defined in claim 1, wherein the meltblown material is first blown onto the spunbond material to form a sub-layer before being attached to the mixed fiber triboelectric material.

10. A filter media as defined in claim 9, wherein the mixed fiber triboelectric material is deposited on the first side of the meltblown/spunbond composite material which has the meltblown material and the mixed fiber triboelectric material is entangled to the meltblown material by needling the materials together.

11. A filter media as defined in claim 1, wherein the netting material comprises first and second major surfaces, the first major surface is placed in contact with the entangled mixed fiber triboelectric material and meltblown material, and the mixed fiber triboelectric material and meltblown are passed through the openings of the netting material such that the second surface of the netting material is substantially covered with the mixed fiber triboelectric material and meltblown material.

12. A filter media as defined in claim 11, wherein the netting material comprises extruded polypropylene netting.

13. A filter media as defined in claim 11, wherein the mixed fiber triboelectric material and meltblown are passed through the openings of the netting material by needle punching them through the openings.

14. A synthetic composite filtration media, comprising:

a mixed fiber triboelectric material;

a meltblown/spunbond composite material having a first side having meltblown fibers, and a second side having spunbonded fibers;

a netting material having first and second surfaces, and a plurality of openings; and the meltblown and spunbonded fibers are entangled with the mixed fiber triboelectric material such that portions of the meltblown fibers and the spunbonded fibers are interspersed into the mixed fiber triboelectric material, and the entangled combination of mixed fiber triboelectric material and the meltblown and spunbonded fibers reside both above and below the first and second surfaces of the netting material and also pass through the plurality of openings in the netting material.

15. A synthetic composite filtration media as defined in claim 14, wherein the meltblown fibers comprise polypropylene fibers and the spunbonded fibers comprise polyester or polypropylene spunbonded fibers.

16. A synthetic composite filtration media as defined in claim 14, wherein the meltblown fibers are comprised of smaller diameter fibers than the spunbonded fibers and the meltblown fibers have an electrostatic charge applied to them.

17. A synthetic composite filtration media as defined in claim 14, wherein the composite filtration media is pleatable.

18. A synthetic composite filtration media as defined in claim 14, wherein the mixed fiber triboelectric material comprises a mixture of modacrylic and polypropylene fibers.

19. A synthetic composite filtration media as defined in claim 14, wherein the netting material is selected from the group of materials consisting of polypropylene, polyethylene and nylon.

* * * * *